Aug. 7, 1928.
C. E. MARSHALL
1,679,837
AIR BRAKE BLEEDER VALVE
Filed April 28, 1927
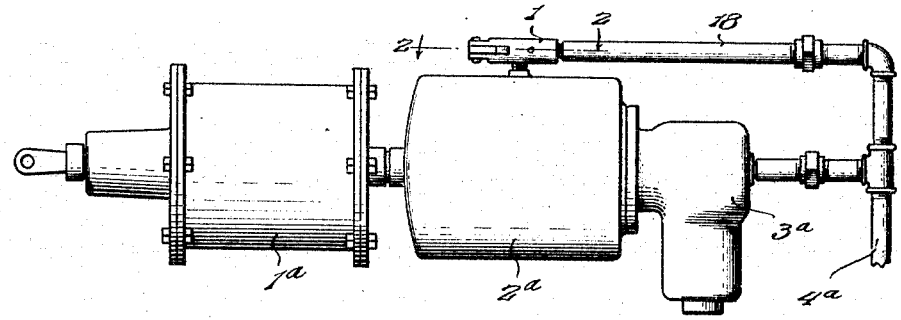
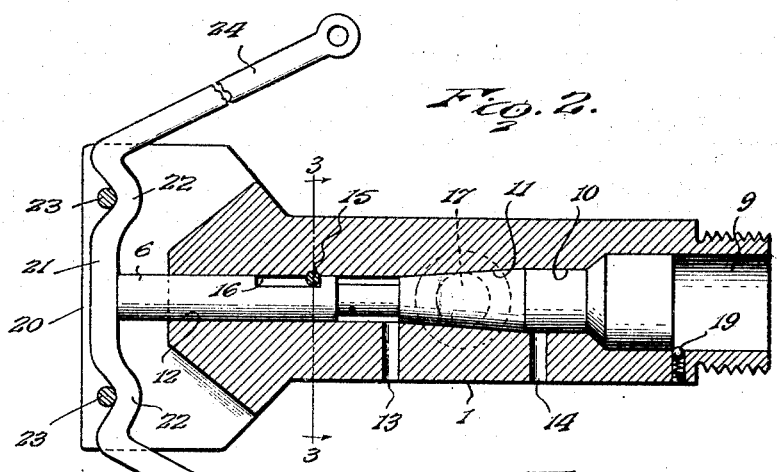
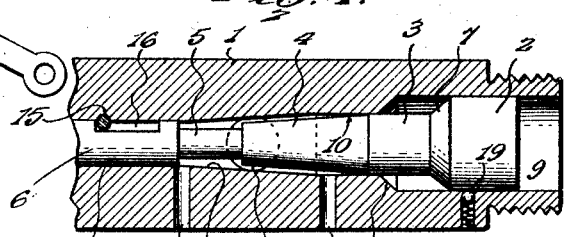
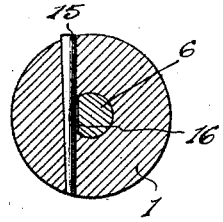
Inventor
C. E. Marshall.
By Lacey & Lacey, Attorneys Patented Aug. 7, 1928.

1,679,837

UNITED STATES PATENT OFFICE.

CLYDE E. MARSHALL, OF PEACH CREEK, WEST VIRGINIA.

AIR-BRAKE BLEEDER VALVE.

Application filed April 28, 1927. Serial No. 187,262.

This invention relates to air brake mechanism and more particularly to the means for reducing the air pressure to effect release of the brakes when required.

The invention provides a valve, for relieving the pressure in the auxiliary air reservoir connected with the brake cylinder, which is normally held closed by the pressure in the train line, thereby obviating the provision of the usual valve seating spring and reducing the number of parts.

The invention furthermore provides means to prevent the casual unseating of the valve by jar, or other cause, when the pressure in the train line is cut off.

The invention also aims to limit the movement of the valve plug and prevent displacement thereof and assure its automatic seating when the pressure is restored to the train line to hold the pressure in the air reservoir and brake cylinder.

While the drawing illustrates a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 represents a brake cylinder, auxiliary air reservoir associated therewith, and a bleeder valve embodying the invention of an air brake system.

Figure 2 is an enlarged sectional view of the bleeder valve on the line 2—2 of Figure 1.

Figure 3 is a transverse sectional view on the line 3—3 of Figure 2.

Figure 4 is a sectional view of a portion of the bleeder valve, showing the valve plug unseated, whereby to bleed the auxiliary air reservoir and brake cylinder.

Corresponding and like parts are referred to in the following description and designated in the several views of the drawings by like reference characters.

The numeral $1^a$ designates the brake cylinder, $2^a$ the auxiliary air reservoir connected with the brake cylinder, and the $3^a$ the usual triple valve of an air brake system. The train line $4^a$ is connected to the triple valve $3^a$ in any usual way. The parts mentioned are of well known construction and operation, and are illustrated to demonstrate the application of the invention which resides in the bleeder valve for reducing the pressure within the air reservoir $2^a$ and brake cylinder $1^a$.

The bleeder valve comprises a casing 1, and a plug movable longitudinally within the casing, and comprising a head 2, a reduced portion 3, a tapered portion 4, a reduced portion 5 and a stem 6, a conical portion 7 is provided at the juncture of the reduced portion 3 and head 2 and is adapted to obtain a seat upon the inner tapered end 8 of a chamber 9 in which the head 2 obtains a snug fit, and is free to have a limited movement. The casing 1 is formed with a longitudinal opening or bore, which is enlarged at one end to provide the chamber 9 and which is reduced, as indicated at 10, to snugly receive the reduced portion 3 of the valve plug. The intermediate portion of the bore or opening of the valve casing 1 is tapered, as indicated at 11, to snugly receive the tapered portion 4 of the plug valve, and the opposite end portion of the opening is reduced to snugly receive the reduced end 6 of the plug valve. Lateral openings 13 and 14 are formed in a side of the casing 1 and communicate at their inner ends with the portions 12 and 10 of the longitudinal bore or opening. These lateral openings 13 and 14 are positioned to receive between them the tapered portion 4 of the valve plug when the latter is seated, as indicated most clearly in Figure 2 of the drawings. When the valve plug is unseated, as indicated in Figure 4 of the drawing, the openings 13 and 14 are in communication with each other through the tapered portion 11 of the opening formed in the valve casing. Longitudinal movement of the valve plug is limited by means of a pin 15, which passes through a transverse opening intersecting the longitudinal opening of the casing 1 and entering a cut away portion 16 of the valve plug. This also prevents displacement of the valve plug when unseated, as indicated most clearly in Figure 4. A lateral opening 17 is formed in a side of the casing 1 and constitutes an inlet and is disposed between the outlets 13 and 14 and is in communication with the tapered portion 11 of the opening formed in the casing 1. A nipple or boss projects from a side of the valve casing 1 in line with the opening 17 and provides means for coupling the valve to the air reservoir 2ª. A pipe 18 couples an end of the valve casing 1 to the train line 4ª thereby admitting of pressure from the train line operating upon the head 2 of the valve plug to hold the latter seated as indicated in Figure 2. A spring ball catch 19 is located in a side of the casing 1 at a point in the length of the chamber 9 to engage the end of the head 2 and prevents casual unseating of the valve plug by jar, vibration, or other cause tending to accidentally unseat the valve and prematurely bleed, or relieve the pressure of the reservoir 2ª and brake cylinder 1ª.

The end of the valve casing 1 opposite that coupled to the train line 4ª is widened, as indicated at 20, and is slotted to receive an operating member 21 in which crimps 22 are formed to receive pins 23 extending across the slot formed in the widened portion 20. Opposite end portions 24 of the operating member 21 are reversely inclined and are adapted to have the force applied thereto for unseating the plug of the bleeder valve, when it is required to relieve the pressure to release the brakes. It is observed that the bleeder valve is normally held seated by the pressure derived from the train line, thereby dispensing with the usual spring employed for this purpose, and which constantly exerts a pressure to effect a seating of the valve, and in consequence the brakeman is required to spend some considerable time in operating each of the bleeder valves when it is required to release the brakes, and which in the aggregate amounts to some considerable time. An instant operation of the member 21 is sufficient to effect an unseating of the valve which remains open until pressure is restored to the train line and the pipe 18, and which pressure operating against the head 2 of the plug valve effects a seating of the latter.

Having thus described the invention, I claim:

1. A bleeder valve for an air brake system, the same comprising a casing having a longitudinal opening therein and lateral openings, the longitudinal opening being adapted to be connected to the train line to receive pressure therefrom, and one of the lateral openings being adapted to be connected with the brake cylinder for relieving the pressure thereof, a plug valve movable in the longitudinal opening of the casing and adapted to be normally held seated by the pressure derived from the train line to close the lateral opening in communication with the brake cylinder, and means mounted upon the opposite end of the valve casing to effect an unseating of the valve when required, said valve having a portion cut away and a pin mounted in the valve casing and entering the cut away portion of the valve to limit its movement.

2. A bleeder valve for an air brake system, the same comprising a casing having a longitudinal opening enlarged at one end, restricted at the opposite end and having an intermediate tapered portion and a portion of uniform diameter and having lateral openings leading from the intermediate portion of the longitudinal opening, and a plug valve having portions in its length corresponding to the several parts of the longitudinal opening of the valve casing.

3. A bleeder valve for an air brake system comprising a casing adapted to be connected at one end to the train line and intermediate its ends to the brake cylinder, and having a longitudinal opening which is enlarged at one end and tapered intermediate its ends, and having inlet and outlet openings leading from the tapered portion of the longitudinal opening, the enlarged end portion of the longitudinal opening forming a chamber having a valve seat at its inner end, and a plug valve in the longitudinal opening comprising an intermediate tapered portion and an enlarged end portion forming a pressure sustaining head operable in the aforesaid chamber and a valve at the inner end of the pressure sustaining head to close upon the said valve seat at the inner end of the chamber.

In testimony whereof I affix my signature.

CLYDE E. MARSHALL. [L.S.]